United States Patent [19]

Adams

[11] Patent Number: 4,544,131
[45] Date of Patent: Oct. 1, 1985

[54] ROTARY VALVE

[75] Inventor: Frederick J. Adams, Clevedon, England

[73] Assignee: TRW Cam Gears Limited, Hertfordshire, England

[21] Appl. No.: 629,213

[22] Filed: Jul. 9, 1984

[30] Foreign Application Priority Data

Aug. 5, 1983 [GB] United Kingdom ............... 8321220

[51] Int. Cl.$^4$ ..................... F16K 11/083; B62D 5/08
[52] U.S. Cl. ............................... 251/309; 137/625.24; 137/625.21; 91/375 R; 91/375 A
[58] Field of Search ................ 251/31, 309, 310, 311, 251/312; 137/625.21, 625.22, 625.23, 625.24; 91/375 A, 375 R

[56] References Cited

U.S. PATENT DOCUMENTS

| | | | |
|---|---|---|---|
| 1,329,881 | 2/1920 | Bloom | 251/311 X |
| 3,404,704 | 10/1968 | Adams | 137/625.22 |
| 3,974,869 | 8/1976 | Abe et al. | 251/309 |
| 4,272,056 | 6/1981 | Komamura et al. | 251/309 |
| 4,290,452 | 9/1981 | Takahashi et al. | 137/625.23 |
| 4,303,099 | 12/1981 | Kernagoret | 137/625.21 |
| 4,339,986 | 7/1982 | Atkin | |

FOREIGN PATENT DOCUMENTS 2028240  3/1980  United Kingdom .

Primary Examiner—Larry Jones
Attorney, Agent, or Firm—Yount & Tarolli

[57] ABSTRACT

A rotary valve for controlling fluid to a power assistance device of a steering gear. A rotor 6 is mounted in the bore 5 of a relatively rotatable sleeve 3 so that displacement of control regions 12 to 15 on the rotor relative to ports 42 to 45 controls fluid flow through two pairs of supply ports 38 to 41. Of the eight ports in the sleeve and rotor assembly two pressure ports 42 and 43 are circumferentially spaced in the sleeve bore and disposed alternately with respect to two low pressure return ports 44 and 45 to be controlled one by each of the four control regions to direct fluid to the power assistance device 26 (for actuation of that device to assist in a steering manoeuvre which imparts the relative displacement between the sleeve and rotor). Each of the return ports 44, 45 is formed by a slot 50 which extends axially in the sleeve bore to open into a radially extending end face of the sleeve and therethrough be in constant communication with a fluid return chamber in the valve. Both slots 44 and 45 can open into a common fluid return chamber or into fluid return chambers at opposite axial ends of the valve. Preferably both return ports 44 and 45 are in the form of slots which extend axially through the bore 6 of the valve sleeve so that they each open into chambers at opposite axial ends of the valve sleeve.

7 Claims, 2 Drawing Figures

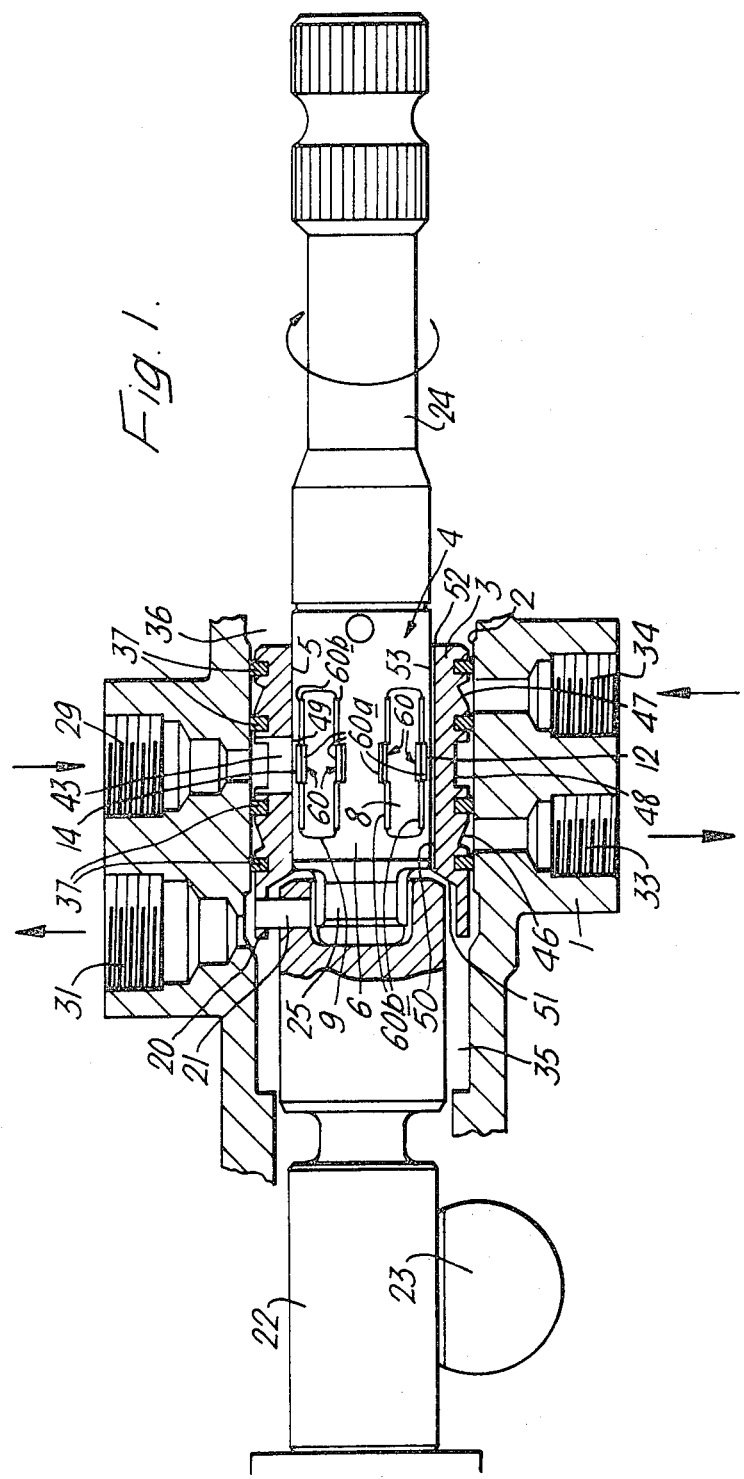

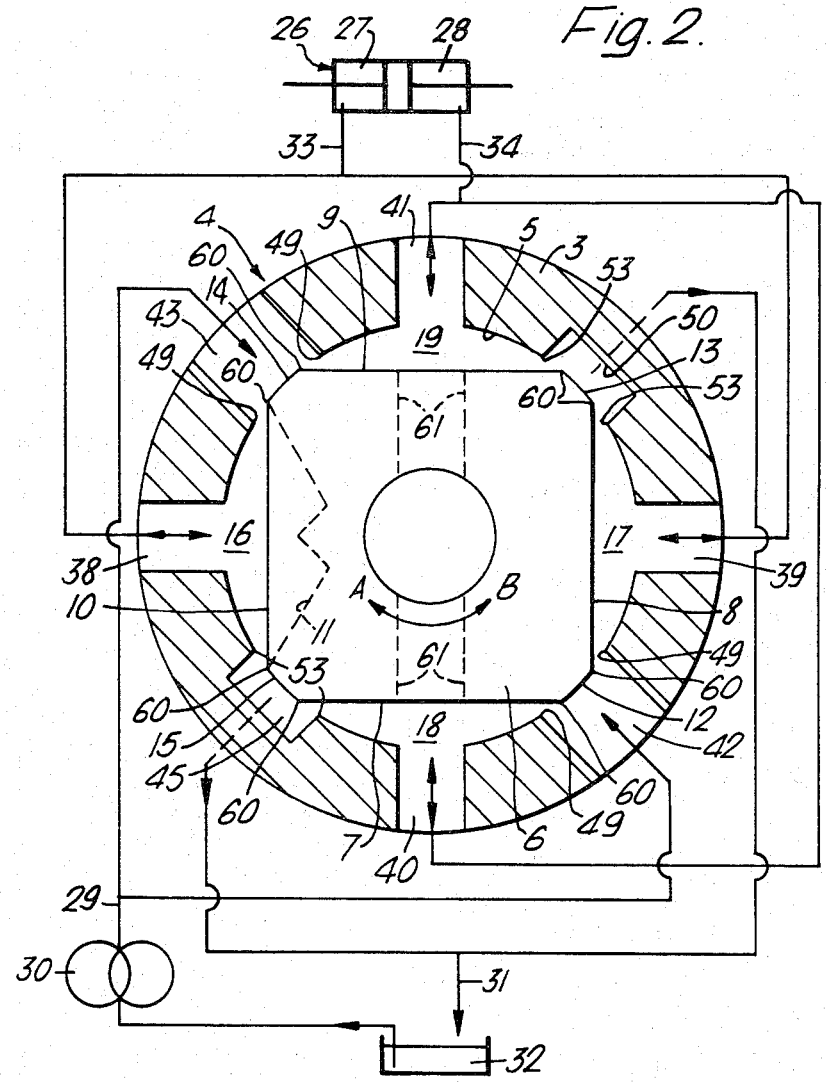

ROTARY VALVE

TECHNICAL FIELD AND BACKGROUND ART

This invention relates to a rotary valve and is primarily concerned with rotary valves of the type utilised for controlling fluid (usually hydraulic) to two opposed pressure chambers of a double acting power assistance device of a steering gear. Rotary valves for power assisted steering gears are well known in the automotive industry and conventionally comprise a rotor mounted in the bore of a sleeve so that during a steering manoeuvre the rotor and sleeve are rotationally displaced relative to each other and in so doing direct fluid through control ports in the valve to and from the power assistance means as appropriate to assist the steering manoeuvre. The power assistance means will usually be in the form of a double acting piston and cylinder device incorporated in the steering gear. Examples of rotary valves of the type aforementioned are to be found in U.K Pat. Nos. 391,775, 476,590, 1,356,172 and 2,028,240 and U.S. Pat. Nos. 1,947,973, 2,328,312, 1,657,412 and 1,773,794. In each of these examples fluid flow through the valve is achieved by providing distributing zones on the rotor which are displaced during the aforementioned relative rotation to determine fluid flow through the ports in the valve, such ports being connected to fluid pressure supply, the power assistance means and a low pressure return (exhaust/reservoir). Since the early 1930s the most favoured sleeve structure has comprised a peripherally spaced array of axially extending, blind ended, recesses in the bore of the sleeve. These recesses constitute ports in the valve and whilst this popular design is efficient and reliable in operation, it suffers from two serious disadvantages. Firstly, the design does not lend itself to economic manufacture on a mass production basis where either several assembly stages are required for producing the sleeve as a two or a three part component as envisaged by the disclosure in U.K. Pat. No. 476,590 and U.S. Pat. No. 1,947,973, or expensive special purpose machinery is necessary for manufacturing the sleeve as a one piece component as envisaged by the disclosure in U.S. Pat. No. 2,328,312 and U.K. Pat. No. 1,356,172. Secondly, the provision of the axially extending blind ended recesses calls for a relatively large sleeve and a correspondingly large housing within which the sleeve and rotor are mounted. This is incompatible with the desirability of providing a small, compact, steering gear as called for in modern vehicles. Although it has hitherto been proposed, for example in U.K. Pat. No. 2,028,240 to provide a sleeve for a rotary valve without blind ended axially extending recess type control ports, it has been found with such a proposal (as in many of the rotary valve proposals having the blind ended axially extending recesses) that a large number of ports and complex array of passages are necessary in the sleeve and/or the rotor to achieve the required fluid flow and also to ensure that the back-pressure in the valve is minimised when the valve is in its neutral condition. On this latter point, it will be seen by way of example that the rotary valve in U.K. Pat. No. 2,028,240 has twenty one ports of which fifteen have associated passages in the rotor and sleeve so in addition to providing a relatively complex hydraulic system, the manufacturing cost of such a valve is considerable.

It is an object of the present invention to provide a rotary valve for a power assisted steering gear which valve is relatively simple in construction, may employ relatively few ports and passages in the sleeve and/or rotor, can be of a design which minimises back pressure when in its neutral condition and will lend itself to economic manufacture as a compact assembly without loss of efficiency or reliability as compared with conventional forms of rotary valves for power assisted steering.

STATEMENT OF INVENTION AND ADVANTAGES

According to the present invention there is provided a rotary valve for control of fluid to two opposed pressure chambers of a double acting power assistance device of a steering gear, the valve comprising a rotor mounted in an axial bore of a sleeve and relative rotation between which varies port means in the valve to control fluid flow for operation of the device, said control of operation being effected, at least in part, by control of fluid flow through pressure port means in the sleeve comprising apertures which extend radially through the wall of the sleeve and through return port means in the sleeve by displacement of axially extending control edges on the rotor relative to control edges formed by the pressure port means and the return port means in the bore, and wherein at least one control edge in the bore is formed by at least one axially extending slot means which constitutes the or a return port means and is in constant communication with a fluid return. Preferably the slot means opens into a radially extending end face of the sleeve to be in constant communication with a fluid return chamber in the valve which is intended to communicate with a low pressure return/exhaust, the control edge or edges formed by the slot means co-operating with axially extending control edge or edges of the rotor to provide an axially extending slot-like aperture the circumferential extent of which progressively opens and closes during rotation of the rotor to open or close communication between a pressure chamber of the device and the low pressure return.

By this proposal axially extending rectilinear control edges in the bore of the sleeve can be formed by a relatively simple machining technique during manufacture of the slot means. Furthermore, the slot-like aperture which is formed by and extends parallel to the co-operating axial control edges and which communicates with the slot means may be designed to ensure an adequate through flow of fluid to the low pressure return to alleviate back pressure when the valve is in its neutral condition. Although the circumferential extent of the slot-like aperture will vary during relative rotation between the sleeve and the rotor, the opening/closing of the aperture can be in a series of two or more stages in which the axial extent of the aperture is constant for each stage but the axial extent of two adjacent stages is different so that the axial extent of the slot-like aperture changes abruptly at the transition from one stage to another; the volume of fluid which can flow through the slot-like aperture will therefore change abruptly at the transition between two stages (although such fluid flow will then change progressively in a particular stage); for pressure balance in the valve the port means will usually be symmetrically disposed around the rotor and sleeve; consequently there will usually be at least two slot means for communication with low pressure return and each such slot means to have associated therewith axial control edges on the rotor and sleeve. The port means will usually comprise two or more return ports, two or more pressure ports and two or more supply ports for the pressure chambers of the power assistance device.

The present invention also provides a rotary valve for control of fluid to two opposed pressure chambers of a double acting power assistance device of a steering gear which valve comprises a sleeve having an axial bore;

a rotor mounted in the bore and rotation of which relative to the sleeve controls fluid flow through port means of the valve, the rotor having a circumferentially disposed array of four fluid distributing zones the circumferential extent of which zones is determined by four control regions of the rotor, said zones forming with the sleeve bore four fluid transfer chambers which transfer chambers are disposed around the rotor to provide two pairs of which the transfer chambers in each pair are diametrically opposed;

in which the port means consists of a first two supply ports for connection to a first pressure chamber of the power assistance device and which two supply ports are in constant communication one with each of the transfer chambers in a first pair, a second two supply ports for connection to the second pressure chamber of the power assistance device and which two supply ports are in constant communication one with each of the transfer chambers in the second pair, two pressure ports for connection to a source of fluid under pressure, and two return ports for connection fo fluid exhaust/reservoir;

said pressure ports and return ports being circumferentially spaced in the sleeve bore and disposed alternately to be controlled one by each of the four control regions of the rotor so that when the rotor is rotated relative to the sleeve and from a neutral condition in one sense, fluid from the pressure ports is directed by way of the first pair of transfer chambers to the first two supply ports while that pair of transfer chambers are closed or closing to communication with the return ports and the second pair of transfer chambers are closed or closing to communication with the pressure ports and open or opening to communication with the return ports, and upon said relative rotation in the opposite sense fluid from the pressure ports is directed by way of the second pair of transfer chambers to the second two supply ports while that pair of transfer chambers are closed or closing to communication with the return ports and the first pair of transfer chambers are closed or closing to communication with the pressure ports and open or opening to communication with the return ports, and wherein each of said two return ports is formed by axially extending slot means in the sleeve bore which slot means opens into a radially extending end face of the sleeve to be in constant communication with a fluid return chamber in the valve.

In a preferred form of the rotary valve of the present invention it is only necessary to provide eight ports of which the two return ports are formed as axially extending slot means while the other ports can be formed as slots or bores or apertures in the sleeve and/or rotor— this permits the ports to be formed by relatively inexpensive machining or other techniques (such as spark erosion) and avoids the necessity, as in conventionally formed sleeves, of forming internal recesses in the sleeve both ends of which recesses are closed or blind.

The valve sleeve of the present invention can be formed as a one piece component by relatively simple machining operations. As implied above, the ports other than the return port or ports may comprise passages which are simply formed by boring, broaching or other conventional machining techniques. The feature that the axially extending slot means can open into an end face of the sleeve lends itself to a sleeve design with a relatively short axial length since fluid flow from the return port or ports is achieved through a side face of the sleeve; in this way the sleeve design can avoid the additional axial length which, with conventional designs (having the axially extending recesses which are closed at both ends of the sleeve), is required to achieve fluid communication to those recesses by way of radial passages which open into the cylindrical outer surface of the sleeve.

Where two return ports are formed by axially extending slot means in the sleeve bore, one or both of the slot means may have an end which terminates within the sleeve bore while the other end opens into the radially extending end face of the sleeve. Where two return ports are formed by axially extending slot means and each such slot means has an end which terminates within the sleeve bore, the slot means may open in the same end of the sleeve to communicate with a fluid return chamber which is common to both. Alternatively, two fluid return chambers can be provided at opposite ends of the valve sleeve and the two return ports can have their axially extending slot means opening one into each of the two fluid return chambers through radial end faces of the valve sleeve which partly define those chambers. Where the two return ports are formed by axially extending slot means which communicate with a common fluid return chamber in the valve and have ends which terminate within the bore, then either the first two or the second two supply ports, or the pressure ports can be formed as a further two axially extending slot means in the sleeve bore which further two slot means terminate at one end within the bore and at the other end open into a radially extending end face of the sleeve to communicate with a second fluid chamber in the valve at the opposite end of the valve sleeve from the aforementioned fluid return chamber. This latter possibility permits a further reduction in the axial extent of the valve sleeve and will usually be applied to either the first two or the second two supply ports so that the second fluid chamber into which the axially extending slots for those supply ports open at the end of the valve sleeve may be one or other of the pressure chambers of the double acting power assistance device. The proposal that the axially extending slot means terminates at one end within the bore while the other end opens into the radially extending end face of the sleeve is further discussed in our co-pending G.B. Pat. No. 8321219 (our reference: FJW/GDG/294).

A preferred arrangement of the present invention is that the or each of the return ports is formed by axially extending slot means in the sleeve bore which slot means extends through the bore to open in axially opposite end faces of the sleeve and communicate with low pressure, fluid return, chambers in the valve at opposite ends of the sleeve. By this preference the return ports can be formed as simple slots, recesses or grooves which are machined completely through the bore of the sleeve within which the rotor is mounted. Since the two chambers at opposite ends of the sleeve are in communication with each other by way of the axial slots and at least one of those chambers will communicate with low pressure return, it will be appreciated that the sleeve will not be subjected to fluid pressure biasing axially.

Each of the axially extending slot means as aforementioned will usually be formed as a discrete recess, slot or groove; however, it is to be realised that one or more of the slot means may be formed by at least two substantially parallel and adjacent, similarly formed, slots. The use of such adjacent slots in forming the slot means has the advantage of providing a bearing surface zone for the rotor in the region of the bore circumferentially between the two adjacent slots—in the case of the return ports and possibly the pressure ports the bearing surface zones may provide support for the control regions of the rotor which are respectively associated with those ports.

The rotary valve of the present invention can be of the open centre type where, in the neutral condition, the pressure ports communicate with the return ports; or of the closed centre type where, in the neutral condition, the pressure ports are closed to communication with the return ports; in both the closed or the open return type the pressure chambers of the double acting power assistance device will, in the neutral condition of the valve, be open to communication with the return port or ports. The characteristics of the aforementioned types of valve are known in the relevant art but the four control regions and the supply and return ports with which they are respectively associated provide a simple design by which the characteristics of the valve may be varied, conveniently by the use of different rotors with varying forms of control regions. The control regions on the rotor will usually be defined by accurately machined control edges which can be profiled to provide required opening/closing characteristics for the ports with which those control edges are respectively associated. By appropriately profiling these control edges on the rotor the opening characteristics of the or a return port through which a pressure of the double acting power assistance device is exhausting may ensure that back pressure is minimised in that pressure chamber when the valve is in its neutral condition.

As previously mentioned, the sleeve is preferably formed as a one piece component (other than, of course, for sealing and bearing means which are conventionally applied to the sleeve) but it is to be realised that the sleeve may be an integral part of a shaft or attached to a shaft which is intended to form part of a steering gear. It is also to be realised that other than for forming the sleeve by what may be regarded as conventional machining techniques such as broaching, milling, shaping and possibly honing or grinding as a finishing operation, the sleeve can be formed by use of a casting or sintering process.

There is further provided a steering gear which incorporates a double acting power assistance device having two opposed pressure chambers and which gear includes a rotary valve constructed in accordance with the present invention for the control of fluid to said pressure chambers.

DRAWINGS

One embodiment of the present invention will now be described, by way of example only, with reference to the accompanying illustrative drawings, in which:

FIG. 1 is an axial section through a steering gear of the rack and pinion type and which includes a rotary valve constructed in accordance with the invention; and FIG. 2 diagrammatically shows a radial section through the rotary valve in FIG. 1 and illustrates a simple form of hydraulic system for control of the power assistance device.

DETAILED DESCRIPTION OF THE DRAWINGS

The steering gear has a housing 1 within a cylindrical bore 2 of which is rotatably mounted a sleeve 3 of a rotary valve indicated at 4. The sleeve 3 has a cylindrical bore 5 mounted in which is a rotor 6. The rotor 3 has a circumferentially spaced array of four fluid distributing zones 7 to 10. As shown in FIG. 2 the rotor may be of generally rectangular section with the distributing zones 7 to 10 formed as substantially flat faces but if required these zones may each be of concave or recessed form as indicated by the broken line 11. The zones 7 to 10 are axially co-extensive in the same part length of the rotor and circumferentially spaced from each other; the circumferential extent of the zones is determined by four control regions 12 to 15. The distributing zones 7 to 10 form with the bore 5 of the sleeve four fluid transfer chambers 16 to 19 which are symmetrically disposed around the axis of the rotor as two pairs 16, 17 and 18, 19 of which the chambers in each pair are diametrically opposed.

The sleeve 3 has an axially extending skirt 20 where it is coupled by a pin 21 for rotation with a pinion 22. A rack bar 23 meshes with the pinion 22 in a manner conventional for rack and pinion steering gears where rotation of the pinion causes displacement of the rack bar and the latter is utilised to provide a steering output. Rotation of the pinion 22 is effected by rotation of a steering shaft 24 which is rigidly coupled for rotation with, or is integral with, the rotor 4. A lost motion rotary coupling 25 is provided between the shaft 24 and pinion 22 and these two components are spring biased rotationally relatively to each other and to a neutral condition in conventional manner (for example by a torsion bar) so that upon a steering manoeuvre being initiated the rotor 6 can undergo restricted rotational displacement relative to the sleeve 3 before a substantial manual steering effort is applied to the pinion 22. This latter relative rotation between the rotor and sleeve is employed to control fluid flow through the rotary valve 4 to power assistance means for the rack bar 23 which means comprises a double acting piston and cylinder device 26 which may be incorporated in the steering linkage in known manner and which has opposed pressure chambers 27 and 28.

The valve housing 1 has a fluid connection 29 for coupling to a source of fluid under pressure such as an engine driven pump 30, a fluid connection 31 for coupling to an hydraulic reservoir 32, a fluid connection 33 for coupling to the pressure chamber 27 and a fluid connection 34 for coupling to the pressure chamber 28. The fluid connections 29, 31, 33 and 34 are intended to communicate with ports in the rotary valve 4 to ensure that during a steering manoeuvre, fluid is delivered to and exhausted from the device 26 to operate the device in a manner consistent with providing assistance to the steering manoevure. The actuation of the valve means to effect this operation is more conveniently considered with respect to FIG. 2; however, it is to be noted that the return connection 31 communicates with a fluid return chamber 35 which is formed in the housing 1 at the end of the sleeve adjacent to the pinion 22 and which chamber 35 conveniently houses the rack and pinion. The end of the sleeve 3 remote from the chamber 35 partly defines a second fluid chamber (partly indicated at 36) in the housing 1. Rotary seals 37 are provided between the sleeve 3 and the bore 2 to close communication between the chambers 35 and 36 and the fluid connections 29, 33 and 34 and also to provide sealed annular recesses in the outer cylindrical surface of the sleeve 3 by which fluid supply can be maintained from the respective connections 29, 33 and 34 to the appropriate ports in the valve sleeve in conventional manner.

As will be seen from FIG. 2 there are eight ports in the bore of the valve sleeve 3. These ports consist of a pair of supply ports 38 and 39 which are diametrically opposed in a common radial plane; a further pair of supply ports 40 and 41 which are diametrically opposed in a further radial plane; a pair of pressure ports 42 and 43 which are diametrically opposed and located in a still further radial plane, and a pair of diametrically opposed return ports 44 and 45. For convenience of description, the ports 38 to 43 are shown in the same radial plane in FIG. 2 but it will be appreciated from FIG. 1 that the three pairs are in practice located in different radial planes. The supply ports 38 and 39 are conveniently formed as simple radially extending bores through the wall thickness of the sleeve 3 to be in constant communication with the transfer chambers 16 and 17 respectively; the ports 38 and 39 communicate with an annular recess 46 in the periphery of the sleeve and therethrough with the connection 33 and the piston chamber 27. The supply ports 40 and 41 are located to be in constant communication with the transfer chambers 18 and 19 respectively and communicate by way of an annular recess 47 in the periphery of the valve sleeve and through connection 34 to the pressure chamber 28 of the power assistance device—again the supply ports 40 and 41 are conveniently formed as simple bores through the wall thickness of the valve sleeve. The opposed pressure ports 42 and 43 are associated with the control regions 12 and 14 on the rotor 6 and these ports are conveniently formed by rectangularly sectioned apertures in the wall of the valve sleeve which apertures open into an annular recess 48 in the periphery of the valve sleeve to communicate with the connection 29 and therethrough with the hydraulic pressure supply from the pump 30. The rectangularly sectioned apertures of the ports 42 are conveniently formed by broaching to provide accurately machined rectilinear control edges 49 in the sleeve bore 5, these control edges preferably extend parallel to the sleeve axis. The return ports 44 and 45 are circumferentially spaced from the pressure ports and disposed alternately with respect to the pressure ports to be associated with the control regions 13 and 15 respectively on the rotor. The return ports 44 and 45 are formed by grooves or slots 50 which extend parallel with the sleeve axis and throughout the length of the sleeve bore (as shown in FIG. 1) so that the opposed axial ends of the slots 50 open into radially extending side faces 51 and 52 of the sleeve and the slots are thereby in constant communication with the opposed chambers 35 and 36 respectively in the valve housing 1. The ports 44 and 45 are consequently in constant communication by way of the slots 50 and the fluid return chamber 35 with the low pressure return 31 to reservoir 32. The slots 50 are conveniently formed by broaching to provide accurately machined rectilinear control edges 53 parallel to the sleeve axis. It is realised that in FIG. 1 the slot 50 is shown out of position (bearing in mind the positioning of the opposed supply port 41)—the slot 50 is shown in FIG. 1 merely to indicate its axial extent through the sleeve 3.

The rotary valve illustrated is of the open centre (to the pressure supply)/open return (to the piston chambers 27, 28) type so that the control regions 12 to 15 of the rotor are centrally disposed with respect to their associated ports 42 to 45 and those ports communicate with both fluid transfer chambers which are respectively adjacent to the respective control regions 12 to 15 (that is in the neutral condition of the valve). Consequently, in the neutral condition fluid pressure from pressure ports 42 and 43 can flow direct to the return ports 44 and 45 while the supply ports 38 to 41 are also in communication with the return ports. If in response to a steering manoeuvre the rotor 6 is displaced in the direction of arrow A relative to the sleeve, fluid from the pressure ports 42 and 43 is directed by way of the respective transfer chambers 17 and 16 to the supply ports 39 and 38 respectively (and thereby to the pressure chamber 27) while those transfer chambers 16 and 17 are progressively closed to communication with the return ports 45 and 44 respectively. Simultaneously, the transfer chambers 18 and 19 are progressively closed to communication with the pressure ports 42 and 43 respectively whilst being increasingly opened to the return ports 45 and 44 respectively so that the supply ports 40 and 41 and thereby the pressure chamber 28 are increasingly opened to low pressure return 31; the piston and cylinder device 26 consequently reacts in response to the steering manoeuvre to assist in the displacement of the steering linkage. As is conventional in rotary valves for power assistance, the spring biasing between the rotor and sleeve causes them to adopt their neutral condition following a steering manoeuvre. If the rotor is now rotated in the opposite sense, that is in the direction of arrow B, with respect to the sleeve, fluid from the pressure ports 42 and 43 will be increasingly directed to the supply ports 41 and 40 (and thereby to the pressure chamber 28) by way of transfer chambers 18 and 19 while those transfer chambers are progressively closed to communication with the return ports 45 and 44; simultaneously the pressure chambers 16 and 17 will be progressively closed to communication with pressure ports 43 and 42 respectively whilst progressively opening to the return ports 45 and 44 respectively to open the supply ports 38 and 39 and thereby the pressure chamber 27 to the low pressure return causing the power assistance device 26 to be displaced in the opposite sense from that aforementioned to assist the steering manoeuvre.

It will be apparent that the characteristics of the rotary valve will be determined, to a substantial extent, by the form of the control edges 49 and 53 in the bore of the sleeve and control edges 60 on the rotor which latter edges determine the circumferential extent of the control regions 12 to 15. It is the circumferential opening and closing of slot-like apertures formed between the control edges 60 on the rotor with the respectively associated control edges 53 and 49 on the valve sleeve which effectively determine the fluid flow characteristics and fluid pressures which may be developed in the valve. The control edges may therefore take many forms, particularly those on the rotor 6 where the edges are conveniently exposed for external machining. An example of the control edges 60 is shown in FIG. 1 where it will be seen that each edge is profiled to open and close a slot-like aperture which it forms with a control edge 49 or 53 by a series of stages 60a, 60b in each of which stages the axial extent of the aperture is constant and the opening/closing will progress uniformly whilst the axial extent of two adjacent stages 60a, 60b is different so that at the transition from one stage 60a to another 60b there is an abrupt increase/decrease in the volume of fluid flow which is permitted through the slot-like aperture to either a pressure port or a return port. By appropriately shaping the control edges 60 on the rotor it can be ensured that the back pressure is minimised when the valve is in its neutral condition. In particular it will be seen that the considerable axial length of the control edges 53 which can be provided by the slots 50 and the considerable axial length of the control edges 60b which are associated therewith can provide a slot-like aperture of considerable area to permit fluid through-flow in the neutral condition.

Although the slots 50 are open at both axial ends of the sleeve 3 it will be apparent that the righthand end of the slots in FIG. 1 could be closed so that the return ports 44 and 45 communicate only with the fluid return chamber 35. Where the slots 50 are closed at the righthand end in FIG. 1 as aforementioned, then the possibility is envisaged that the chamber 36 in the pinion housing could constitute one of the pressure chambers in the double acting device 26 so that one or other pair of the supply ports could then communicate with the chamber 36; indeed, in this latter modification the appropriate pair of supply ports 38, 39 or 40, 41 which communicate with the pressure chamber 36 could be formed as slots similarly to the return ports but which are open through the end face 52 of the sleeve to the chamber 36 but are closed at their ends adjacent to the chamber 35. In a still further modification one or other pair of the supply ports can be located in the rotor as indicated by the broken lines 61 to communicate with a passage in the rotor through which fluid is delivered to the appropriate piston chamber (28 in the example shown in FIG. 2); usually the rotor will be tubular to accommodate a torsion rod and the bore of the rotor may conveniently form a fluid passage.

It will be apparent from FIG. 2 that the open centre type valve may readily be converted to a closed-centre type by simple substitution of one rotor for another in which the control regions 12 to 15 are appropriately dimensioned with respect to the ports 42 to 45 in the valve sleeve with which they are respectively associated to provide the required characteristics. It will also be realised that the pressure ports 42 and 43 are not necessarily rectangular in section and may, for example, be formed as simple cylindrical bores which extend radially through the wall of the sleeve so that the control edges 49 of these ports will be of a generally arcuate shape (this latter example may be preferred for closed-centre type valves).

By arranging for the return port slots 50 to be closed at the righthand end of the valve sleeve in FIG. 1 and for one pair of the supply ports to be in the form of slots which open only into the chamber 36 as aforementioned, it will be apparent that the axial extent of the valve sleeve 3 can be decreased considerably since there is no requirement for one or the other of the annular recesses 46 or 47 and the appropriate connection 33 or 34 can be directed to the chamber 36.

The control edges 60 which respectively lead and trail the distributing zones 7 to 10 can have different profiles or dimensions to determine the valve characteristics depending upon the direction of relative rotation between the sleeve and rotor; in FIG. 1 it will be seen that the stages 60a for the control edges on one side of each of the zones 8 and 9 have a circumferential extent greater than that of the control edges 60a on the other side of those respective zones.

I claim:

1. A rotary valve for controlling fluid flow to opposite pressure chambers of a double-acting fluid motor for providing power assistance in a steering gear, said rotary valve comprising a generally cylindrical sleeve having an axial bore therethrough, said sleeve having a plurality of port means communicating fluid flow through said sleeve, a rotor mounted in said axial bore, relative rotation between said rotor and sleeve controlling fluid flow through said plurality of port means, said plurality of port means including inlet port means extending radially through said sleeve and communicating with a source of fluid and return port means communicating with a reservoir, fluid flow through said inlet and return port means being controlled by circumferential displacement of axially extending control edges on said rotor extending along the length thereof relative to control edges of said inlet and return port means formed by the intersection of said inlet and return port means with said axial bore, said return port means including a plurality of axially extending grooves formed in the inner surface of said axial bore in said sleeve, said inner surface of said sleeve being free of axially extending grooves other than said return port means, said sleeve having opposite radially extending end faces partially defining fluid chambers on the opposite ends of said sleeve which chambers are connected in fluid communication with said reservoir, and said axially extending grooves opening into said opposite radially extending end faces for communicating with said fluid chambers, the control edges on said return port means being defined by axially extending edges formed by the intersection of said axially extending grooves with said axial bore, said axially extending edges and respective edges on said rotor defining axially extending slot-like apertures the circumferential extent of which varies upon relative rotation of said sleeve and rotor to increase or decrease fluid flow from a pressure chamber of said double-acting fluid motor to said opposite fluid chambers.

2. A rotary valve as claimed in claim 1 wherein said inlet port means includes at least one passage extending radially through said sleeve and having a rectangular cross sectional configuration throughout its extent.

3. A rotary valve for controlling fluid flow to opposite pressure chambers of a double-acting fluid motor for providing power assistance in a steering gear, said rotary valve comprising a generally cylindrical sleeve having an axial bore therethrough, said sleeve having a plurality of port means communicating fluid flow through said sleeve, a rotor mounted in said axial bore, relative rotation between said rotor and sleeve controlling fluid flow through said plurality of port means, the rotor having four circumferentially disposed fluid distributing zones, the circumferential extent of each zone being determined by four control regions on said rotor, said four zones and the circumference of said axial bore defining four fluid transfer chambers, said four fluid transfer chambers forming two pairs of fluid transfer chambers, the fluid transfer chambers of each pair being diametrically opposed, said plurality of port means comprising
- a first pair of working ports for connection to one pressure chamber of the double-acting fluid motor, said first pair of working ports extending radially through said sleeve and being connected in constant fluid communication with a first pair of fluid transfer chambers, respectively,
- a second pair of working ports for connection to another pressure chamber of the double-acting fluid motor, said second pair of working ports extending radially through said sleeve and being connected in constant fluid communication with the a second pair of fluid transfer chambers, respectively,
- a pair of inlet ports for connection to a source of fluid, said pair of inlet ports extending radially through said sleeve,
- a pair of return ports for connection to a reservoir, said inlet ports and said return ports being alternatively arranged around the sleeve bore,
- relative rotation of said rotor and sleeve in one of two opposite direction providing for increased fluid communication between said pair of inlet ports and said first pair of fluid transfer chambers and between said first pair of fluid transfer chambers and said first pair of working ports and for decreased fluid communication between said first pair of fluid transfer chambers and said pair of return ports and for decreased fluid communication between said pair of inlet ports and said second pair of fluid transfer chambers and increased fluid communication between said second pair of fluid transfer chambers and said pair of return ports, and relative rotation of said rotor and sleeve in the opposite direction providing for increased fluid communication between said pair of inlet ports and said second pair of fluid transfer chambers and between said second pair of fluid transfer chambers and said second pair of working ports and for decreased fluid communication between said second pair of fluid transfer chambers and said pair of return ports and for decreased fluid communication between said pair of inlet ports and said first pair of fluid transfer chambers and increased fluid communication between said first pair of fluid transfer chambers and said two return ports.,
- said pair of return ports comprising a pair of axially extending grooves formed in the inner surface of said axial bore, said sleeve having opposite radially extending end faces partially defining fluid chambers on the opposite ends of said sleeve which chambers are connected in fluid communication with said reservoir, said axially extending grooves opening into said opposite radially extending end faces for communicating with said fluid chambers, said inner surface of said bore being free of axially extending grooves other than said return ports.

4. A rotary valve as claimed in claim 3 wherein each of said inlet ports if formed by a bore radially extending through said sleeve and having a rectangular cross-section throughout its extent, the intersection of said inlet port bores with said axial bore in said sleeve defining control edges.

5. A rotary valve as claimed in claim 3 wherein said rotor includes axially extending control edges for controlling fluid flow through said inlet ports and said return ports.

6. A rotary valve as claimed in claim 5 wherein said control edges of said rotor cooperate with respective control edges of said inlet and return ports to define a plurality of slot apertures the circumferential extent of which changes during relative rotation of said rotor and sleeve, said control edges of said rotor being profiled such that said circumferential extent changes in a series of stages in each of which stages fluid flow through said slot apertures progressively increases or decreases while fluid flow through said slot apertures increases or decreases sharply at transition from one stage to another.

7. A rotary valve as claimed in claim 6 wherein said four fluid distributing zones are co-extensive with said four control regions.

* * * * *